United States Patent [19]

Cametti et al.

[11] Patent Number: 4,622,860
[45] Date of Patent: Nov. 18, 1986

[54] METHOD AND APPARATUS FOR SWING GEAR AND BEARING ASSEMBLY FOR POWER MINING SHOVEL

[75] Inventors: Richard J. Cametti; Rodney A. Mitton, both of Marion, Ohio

[73] Assignee: Dresser Industries, Inc., Dallas, Tex.

[21] Appl. No.: 747,849

[22] Filed: Jun. 24, 1985

[51] Int. Cl.$^4$ .................... B21D 53/28; B66C 23/26; F16H 55/12

[52] U.S. Cl. .................... 74/448; 29/159.2; 29/402.08; 212/175; 384/593; 384/621; 414/687; 414/690

[58] Field of Search .................... 74/448; 37/124, 125, 37/126 R; 29/159.2, 402.08; 212/175; 414/694, 695.7, 695.8, 690, 686, 687; 384/593, 621

[56] References Cited

U.S. PATENT DOCUMENTS

| | | | |
|---|---|---|---|
| 2,049,654 | 8/1936 | Ljungkull | 384/621 |
| 3,742,779 | 7/1973 | Shaver | 74/448 |
| 3,888,357 | 6/1975 | Bauer et al. | 74/448 X |
| 3,937,540 | 2/1976 | Morizur | 384/593 |
| 4,236,863 | 12/1980 | Baron | 384/593 |
| 4,239,305 | 12/1980 | Baron | 384/593 |
| 4,248,488 | 2/1981 | Sable | 384/593 |

*Primary Examiner*—Allan D. Herrmann

[57] ABSTRACT

An improved swing gear for a power mining shovel which can be removed and replaced simply by partially separating the upper rotatable frame assembly from the lower stationary frame assembly and including upper and lower bearing rails formed of a plurality of arcuate segments and a plurality of arcuate bearing segments removably coupled to each other to form a circular bearing arrangement positioned between the upper and lower bearing rails whereby the bearing segments and bearing rail segments may be removed and replaced in an area exposed by the upper frame assembly without any separation of the upper rotatable frame assembly from the lower stationary assembly.

30 Claims, 7 Drawing Figures

METHOD AND APPARATUS FOR SWING GEAR AND BEARING ASSEMBLY FOR POWER MINING SHOVEL

BACKGROUND OF THE INVENTION

The present invention relates to power mining shovels and in particular to the swing gear and bearing assembly coupling the upper rotating portion of the power shovel to the lower stationary portion.

Power shovels generally comprise an upper rotatable portion coupled to a lower portion which is stationary with respect to the rotatable portion but has treads for forward and reverse movement of the shovel. The upper portion includes the frame and the power units to which is attached a boom and on the outer end of the boom is a dipper or a shovel. A gear and bearing assembly couples the upper portion to the lower portion so that the upper portion can rotate to either side to pick up materials with the dipper or shovel. Thus, the bearing and gear assembly couples the upper portion with the lower portion for relative rotation and is driven by a large motor having a driving gear thereon. Since these machines are of extremely large size and can handle anywhere from 25 to 65 cubic yards per dipper or shovel, it is easy to understand that a great deal of pressure or force is applied to and wear occurs on the gear and bearing assembly which couples the upper portion to the lower portion for relative rotation.

The gear and bearing assembly comprises a gear rigidly attached to the lower stationary frame, a lower bearing rail attached to or associated with the gear, a bearing assembly rotatably placed on the lower bearing rail, and an upper bearing rail assembly attached to the upper frame assembly for resting on the bearing assembly for rotation of the upper frame assembly. The gear itself is of unitary construction and is concentrically located about a center journal which locates the pivot point about which the upper frame assembly rotates with respect to the lower frame assembly. In addition, the upper and lower bearing rails and the bearing assembly itself are usually formed in segments which are coupled together to form the necessary bearing assembly upon which the upper frame rotates with respect to the lower frame. A portion of the lower bearing rails and bearing assembly and the gear protrude beyond the upper frame assembly in the area where the upper bearing rail segments are separated thereby exposing a portion of the gear, lower bearing rails and bearing assembly for inspection. However, the bearing rail segments and the bearing segments themselves are larger than the exposed area created by the separation of the upper bearing rails and thus cannot be removed and replaced in the exposed area.

Therefore, if the gear and/or bearing rails and bearing assembly segments are required to be replaced, it is necessary to effect a total separation of the two assemblies by complete removal of the upper assembly from the lower assembly to allow the gear to be removed from around the center journal and replaced. Further, at least a partial separation of the upper frame assembly from the lower frame assembly is required to allow the upper and lower bearing rails and bearing assembly itself to be replaced. Because of the size of these machines, it is necessary that they be either moved to a location where heavy equipment exists which can lift the upper rotatable assembly from the lower assembly or such heavy machinery must be taken to the site where the mining shovel is located so that the upper rotatable portion of the shovel can be totally removed or at least partially separated from any contact with the lower portion as stated so that the necessary repairs can take place. Obviously this is extremely time consuming and expensive, not only because of the necessary movement of either the shovel or the heavy equipment, but because the removal of the upper rotatable portion of the shovel from the lower stationary portion is extremely difficult and a complex task which requires long periods of time.

Further, when the gear is replaced, it is obvious that it must be properly positioned about the center journal to allow proper concentric rotation of the upper portion of the shovel with respect to the lower portion when the unit is reassembled. However, each gear is specially and individually made for each lower frame assembly and, therefore, when the new gear is used to replace the old gear, a great deal of care must be taken to first position the gear correctly and concentrically about the center journal, and secondly to drill new holes and enlarge and thread old holes to provide for accurate attachment of the gear to the lower frame assembly by means of bolts in such a manner that the gear will not slip when the tremendous forces are applied to it. Thus, a great deal of time and labor is consumed in attempting to properly align the new gear and attach it to the lower frame assembly.

Thus, it is an object of the present invention to overcome the disadvantages of the prior art by providing a gear and bearing assembly which is much easier to remove and replace than in the prior art.

It is also an object of the present invention to provide a swing gear which can be removed and replaced simply by partially separating the upper rotatable frame assembly from the lower stationary frame assembly.

It is still another object of the present invention to provide a swing gear locating member on the lower frame assembly which enables accurate positioning of the swing gear and also prevents linear sliding movement of the gear with respect to the lower frame.

It is yet another object of the present invention to provide a swing gear which is formed in segments that can be removed from the lower frame assembly section by section, thereby avoiding the necessity for a complete removal of the upper frame assembly from the lower frame assembly to allow such gear removal to occur.

It is also an object of the present invention to provide a lower bearing rail and an upper bearing rail, both of which are formed in segments and a plurality of bearing segments which are detachably coupled to each other to form a circular bearing arrangement positioned between the upper and lower bearing rails whereby the bearing segments and the bearing rail segments may be removed and replaced in the exposed area formed by the upper frame assembly and the separated upper bearing rails without any separation of the upper rotatable assembly from the lower stationary assembly.

SUMMARY OF THE INVENTION

Thus the present invention relates to a method of improving the swing gear assembly for a power mining shovel having a first frame assembly coupled to a second frame assembly for relative rotation by said swing gear assembly, said method comprising the steps of rigidly attaching a swing gear locating member on the first frame assembly for accurately positioning the swing gear and preventing linear sliding movement of the gear with respect to the first frame, forming the swing gear of at least two matching annular segments, joining said gear segments together with respect to the locating member to form a unitary swing gear assembly accurately positioned on the first frame assembly, and removably attaching the gear segments to said locating member in a fixed orientation, whereby the swing gear may be removed and replaced upon moving the first frame assembly in spaced relationship to the second frame assembly without total separation of the two assemblies.

The invention also relates to an improved swing gear assembly for a power mining shovel having a first frame assembly coupled to a second frame assembly for relative rotation by said swing gear assembly comprising a swing gear locating member rigidly attached to the first frame assembly for accurately positioning the swing gear and preventing linear sliding movement of the gear with respect to the first frame, at least first and second matching annular gear segments forming a unitary swing gear when joined, and means for removably attaching the gear segments to said locating member to form a unitary swing gear assembly accurately positioned on the first frame assembly whereby the swing gear may be removed and replaced without total separation of the first and second frame assemblies.

The invention also relates to a method of improving the swing gear bearing assembly rotatably coupling a first frame assembly of the power mining shovel to a second frame assembly, the first frame assembly creating an exposed area for inspecting the swing gear and bearing assembly, the method comprising the steps of removably attaching a first plurality of arcuate bearing rail segments to the swing gear to form a 360 degree bearing rail, removably attaching a second plurality of arcuate bearing rail segments to the swing gear to form a 360 degree bearing rail, removably attaching a second plurality of arcuate bearing rail segments to the first frame assembly to form first and second arcuate but separated sections of bearing rail in juxtaposed relationship to said first bearing rail segments, said separation of said arcuate sections occurring in said exposed area formed by said first frame assembly, and positioning a bearing assembly between said first and second bearing rails to bear the rotatable load during relative rotation of said first and second frame assemblies, said bearing assembly being formed of a plurality of bearing segments, each of which is larger than a corresponding one of said first or second rail segment and each of which is smaller than said exposed area created by said first frame assembly whereby each of said first and second rail segments and each of said bearing segments may be removed and replaced through in said exposed area without any separation of said first and second frame assemblies.

The invention also relates to an improved swing gear bearing assembly for coupling a first frame assembly of the power mining shovel to a second frame assembly for relative rotation of said assemblies, said first frame creating an exposed area for inspecting said swing gear and bearing assembly, said improved assembly comprising a plurality of first bearing rail segments rigidly attached to said swing gear to form a 360 degree bearing rail, a plurality of second bearing rail segments rigidly attached to said first frame assembly to form first and second arcuate but separated sections of bearing rail in juxtaposed relationship to said first bearing rail segments, said separation of said arcuate segments occurring in said exposed area created by said first frame assembly, and a bearing assembly positioned between said first and second bearing rails to bear the rotatable load during relative rotation of said first and second frame assemblies, said bearing assembly being formed of a plurality of bearing segments each of which is larger than a corresponding one of said first or second rail segments and each of which is smaller than said exposed area created by said first frame assembly, whereby each of said first and second rail segments and each of said bearing segments may be removed and replaced in said exposed area without separation of said first and second frame assemblies.

BRIEF DESCRIPTION OF THE DRAWINGS

These and other objects of the present invention will be explained more fully in connection with the accompanying drawings in which:

FIG. 6 is a plan view of the novel bearing assembly illustrating the upper rail segments formed by first and second arcuate but separated sections of bearing rail in juxtaposed relationship to the bearing ring and the lower bearing rail segments, said separation of the upper bearing rail segments creating an exposed area in relation to the gear and lower rail and bearing assembly and also illustrates a segment of the bearing assembly located between the upper and lower bearing rails, said bearing segment being larger than a corresponding one of the upper and lower rail segments and all of which are smaller than the exposed area created by the upper frame assembly and the separation in the upper bearing rails whereby each of the upper and lower rail segments and each of the bearing egments may be removed and replaced in the exposed area without any separation of the upper and lower frame assemblies from their normal positions.

DETAILED DESCRIPTION OF THE DRAWINGS

Figure 1:
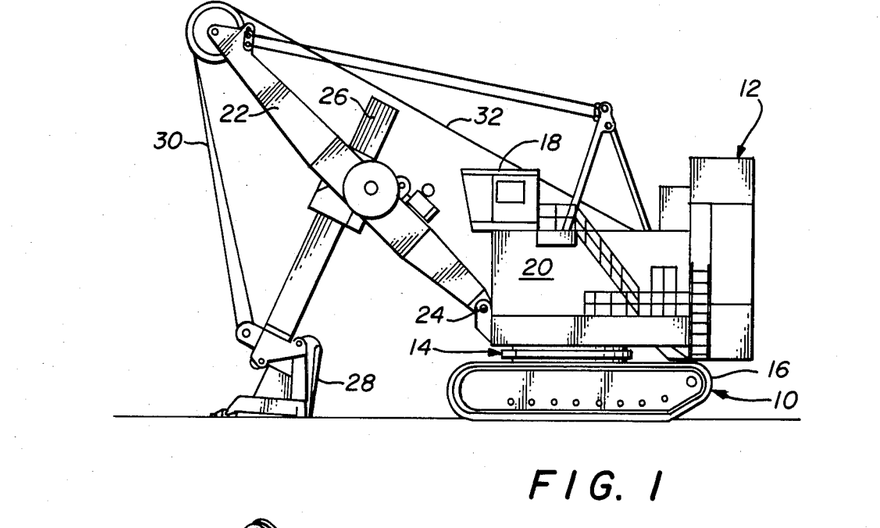
FIG. 1 is a diagramatic representation of a side view of a power shovel including the upper rotatable portion separated from the lower stationary portion by means of a swing gear and bearing assembly.

FIG. 1 is a diagramatic side view representation of a typical power mining shovel which has a lower stationary portion (10) and an upper rotatable portion (12) rotatably coupled to the stationary portion (10) by means of a gear and bearing assembly (14). The lower stationary portion (10) is mounted on tracks (16) which allow forward or reverse motion of the entire mining shovel. The upper rotatable portion (12) includes an operator's cab (18) and equipment housing (20). A boom (22) is coupled to the housing (20) at a pivot point (24) and has attached thereto an arm or handle (26) to the end of which is a bucket or dipper (28) which cuts loose and acdummulates the material which is to be removed by the shovel. Appropriate cables (30) and (32) allow movement of the bucket (28) in the vertical plane. Of course appropriate motors are utilized to operate the cables and the arm (26) to allow the bucket (28) to be positioned properly to remove the materials involved. In addition, of course, the upper frame assembly (12) rotates 360 degrees to allow the bucket (28) to be placed wherever it is needed to remove material.

Figure 2:
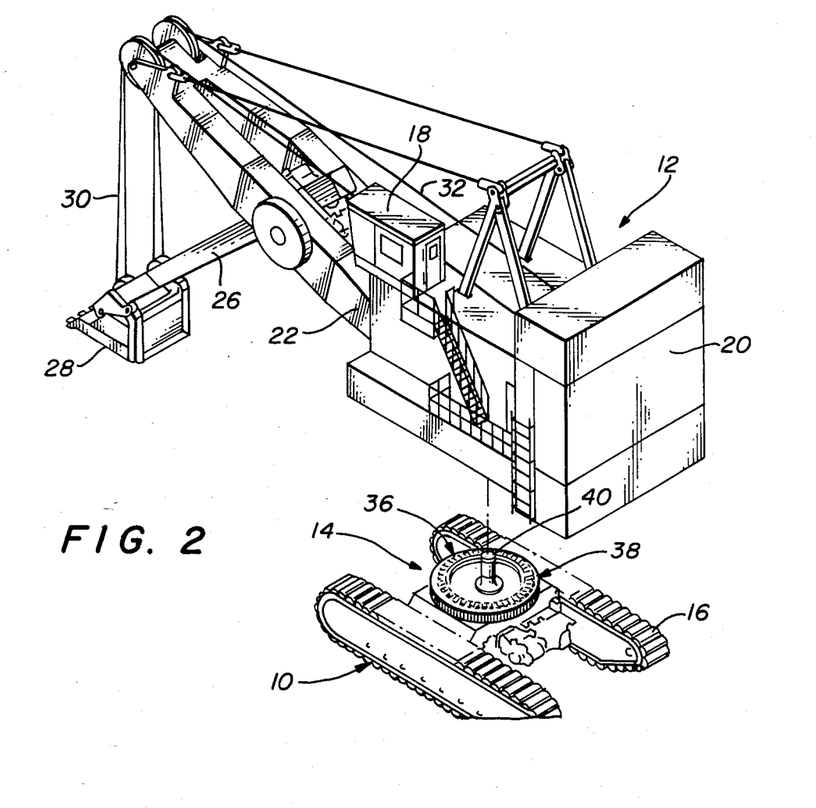
FIG. 2 is an exploded view of a power shovel illustrating the swing gear and bearing assembly mounted on the lower stationary frame and providing the means by which the upper frame is rotatably connected to the lower stationary frame.

FIG. 2 is an exploded diagramatic presentation of the power shovel in FIG. 1, wherein like numerals indicate like components in FIG. 1. In FIG. 2 it will be seen that swing gear bearing assembly (14) includes a swing gear (38) rigidly attached to said lower frame assembly (10) and concentrically located with respect to center journal (40) which serves as the rotatable pivot point for the upper frame assembly (12). A roller bearing (36) is associated with gear (38) and absorbs the load placed thereon by the upper frame assembly (12).

Figure 3:
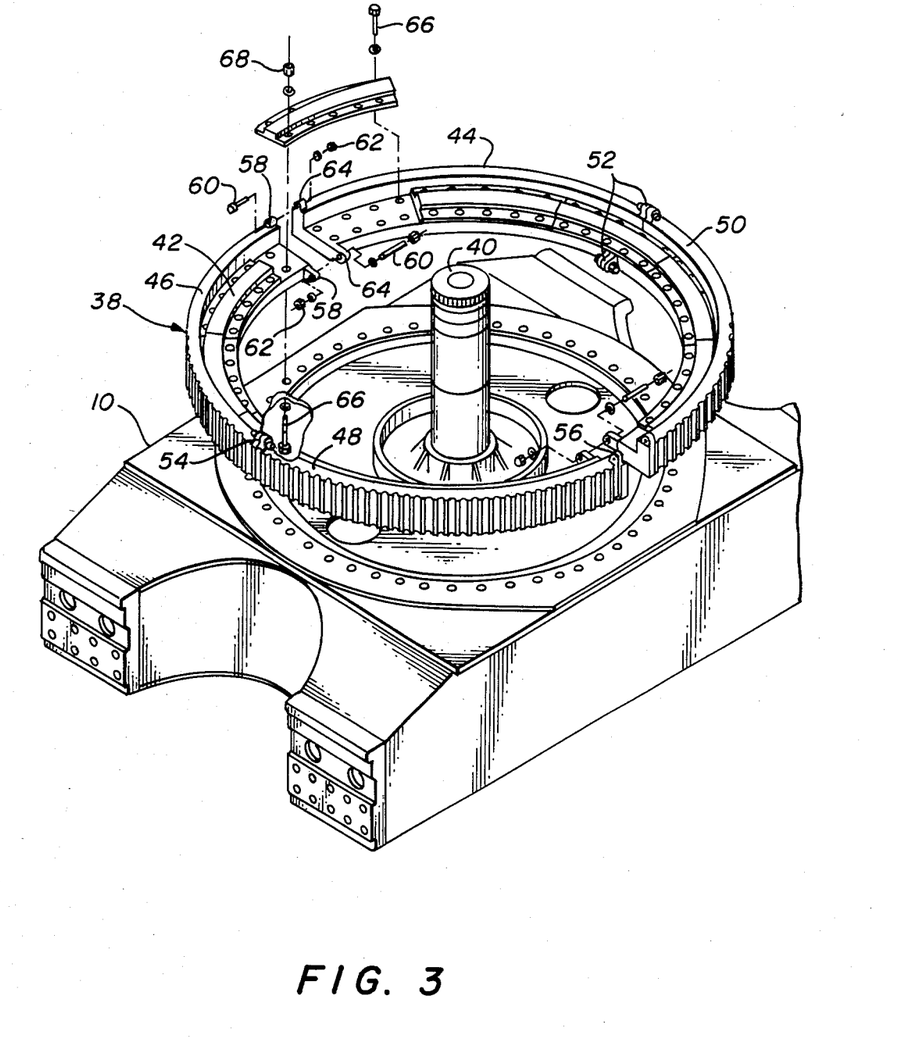
FIG. 3 is an exploded view of the gear segments of the present invention illustrating the manner in which the ring gear and lower bearing rail segments are attached to the lower frame assembly.

FIG. 3 is a partially exploded view of the swing gear and lower rail segments of the present invention illustrating the matter in which they are assembled and attached to the lower frame assembly (10). As can be seen in FIG. 3, the gear (38) is comprised of four matching segments, (44), (46), (48) and (50), which are joined at (52), (54), (56) and (58) as by means of bolts (60) and nuts (62), passing through flanges (64). Thus, the swing gear (38) becomes a unitary assembly when bolted together as indicated. In addition, a plurality of lower bearing rail sections (42) are placed on the inner upper surface of swing gear (38) and are attached, along with swing gear (38), to the lower frame assembly (10) by means of bolts (66) and corresponding nuts (68). Although FIG. 3 is not drawn to scale, it will be understood that swing gear (38) is concentrically located about the center journal (40) to provide for smooth and proper rotation of the upper rotatable frame assembly (12) with respect to the lower frame assembly (10).

Figure 4:
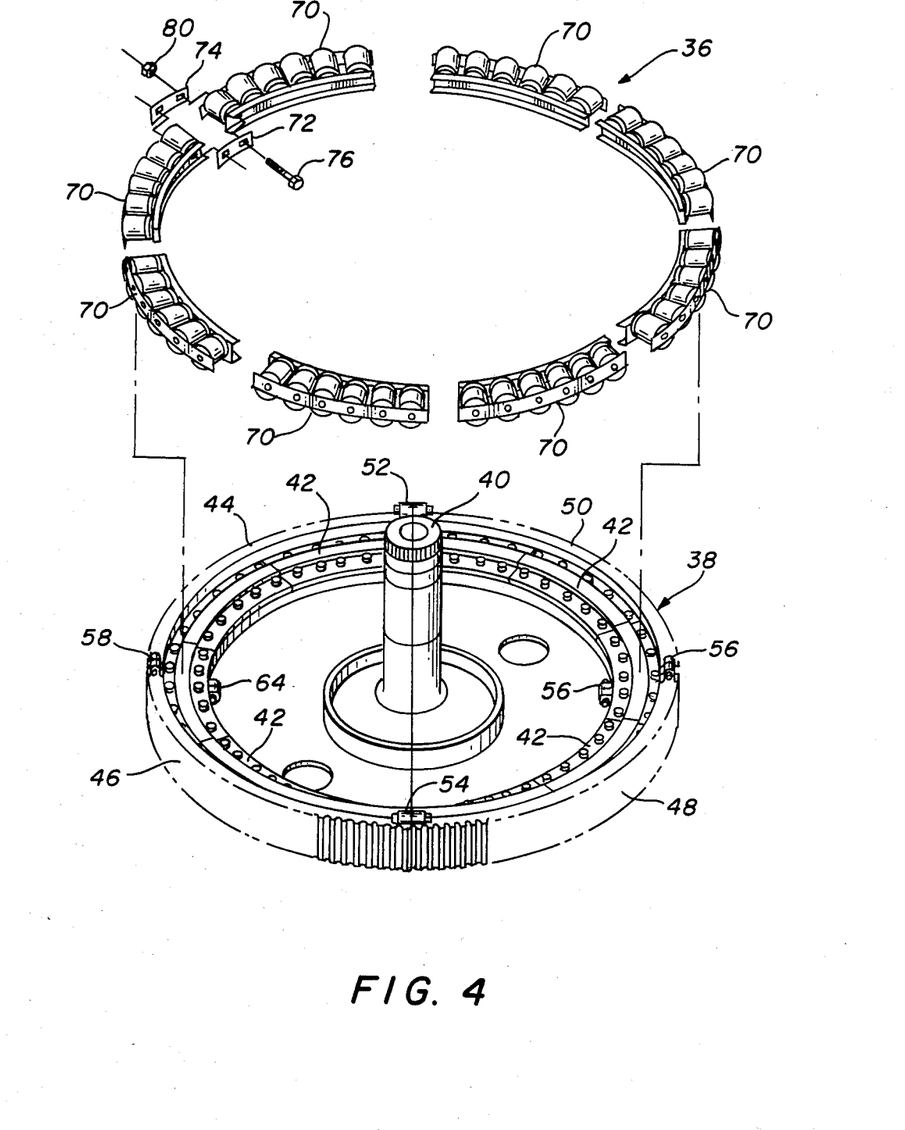
FIG. 4 is an exploded view of the bearing segments and the gear and lower bearing rail segments illustrating how the bearing roller segments are positioned on and rotate on the lower bearing rail assemblies which are attached to the gear assembly.

FIG. 4 is an exploded view of the swing gear and bearing assembly in which like components are again represented by like numerals. As can be seen in FIG. 4, swing gear (38) has mounted thereon a plurality of lower bearing rail segments (42) and is concentrically located about and with respect to the center journal (40). A plurality of roller bearing segments (70) are joined together as by means of plates (72) and (74) and fastening means such as bolt (76) and associated nut (80). When joined together as indicated, these segments form a unitary bearing race which sits on the lower bearing rail segments (42) to absorb the load of the rotating upper frame assembly (12) when placed thereon.

Figure 5:
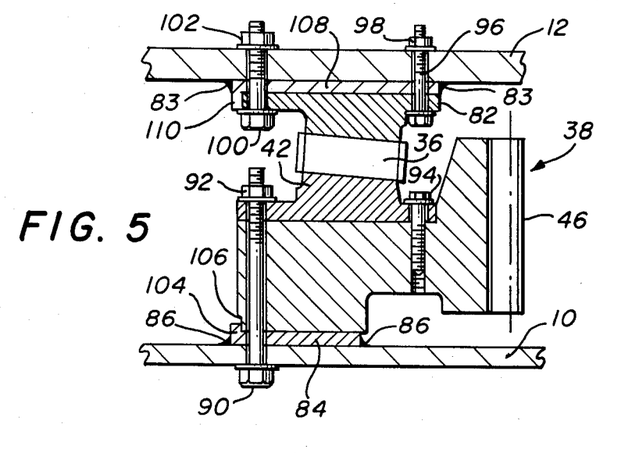
FIG. 5 is a cross-sectional view of the gear and bearing assembly illustrating how the bearing assembly is positioned between the first and second bearing rails to bear the rotatable load during relative rotation of the first and second frame assemblies and also illustrates the swing gear locating member which is attached to the lower stationary frame assembly for accurate positioning of the gear assembly and preventing it from having a linear sliding movement with respect to the lower stationary frame assembly.

A cross-sectional view of the entire swing gear and bearing assembly as it is positioned between and absorbs the load of the upper frame assembly (12) with respect to the lower frame assembly (10) is shown in FIG. 5. As can be seen in FIG. 5, swing gear (38) has gear teeth (47) on the outer periphery thereof and has also attached thereto on the upper portion thereof a lower bearing rail segment (42). A bearing segment (36) is located between lower bearing rail segment (42) and upper bearing rail segment (82). Upper bearing rail segment (82) is attached to the upper rotatable frame (12) by means of bolt (96) and nut (98) and bolt (100) and associated nut (102). In like manner, swing gear (38) is rigidly attached to the lower frame assembly (10) by means of bolt (90) and associated nut (92) which also hold the lower bearing rail segment (42) rigidly attached thereto. In addition, bolt (94) also assists in holding the lower rail assembly (42) rigidly attached to the swing gear assembly (38).

It will be noted in FIG. 5 that a swing gear locating member (84) is rigidly attached to the lower frame assembly (10) by mean such as welds (86). It will also be noted that a vertical annular projection (104) extends from locating member (86) to form a lip against which the lower recessed portion (106) of the inner periphery of the swing gear assembly (38) rests. Thus, locating member (84) is an annular plate having a vertical annular projection (104) thereon. Locating member (84) has a diameter such that the projection (104) abuts the inner periphery (106) of the annular swing gear (38) whereby the gear (38) is prevented from sliding linearly with respect to the lower frame assembly (10). Locating member (84) obviously is required to be accurately positioned and welded at (86) during construction of the power mining shovel or during modification of an existing power shovel. However, once it has been accurately positioned and welded to lower stationary frame (10), swing gear assembly (38) is easily attached thereto simply by positioning gear segments (44), (46), (48), and (50) thereon and bolting them together. A similar second locating member (108) having a projecting lip (110) thereon may be utilized in a similar manner to accurately position upper bearing rail assembly (82) with respect to the upper frame assembly (12) and is welded at (83) to frame (12). Spacing assembly (108) is also an annular plate which matches the annular shape of the upper bearing rail segments (82).

Figure 6:
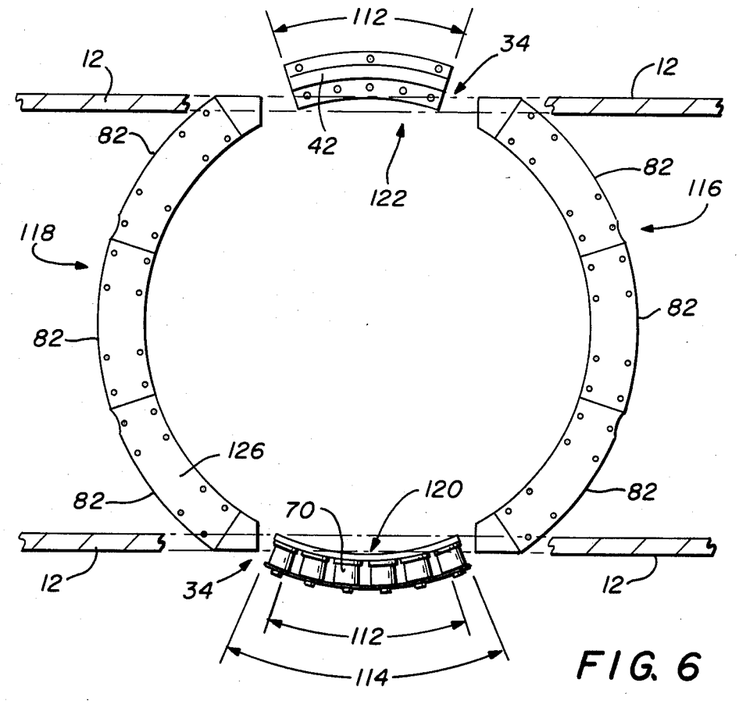

FIG. 6 is a plan view illustrating the relationship of the upper bearing rail segments (82) with respect to the lower bearing rail segments (42) and the bearing roller segments (70). Thus, the first plurality of upper bearing rail segments (82) are attached to the upper frame assembly (12) shown in FIG. 5 and form first and second arcuate but separated sections of bearing rail (116) and (118). The separation of the two sections occurs in the areas designated by numerals (120) and (122). The lower rail segments (42) continue in a 360 degree circle in juxtaposed relationship with and under the upper bearing rail segments (82). Bearing assembly (36), which includes the connected plurality of individual segments (70), is positioned between the upper and lower bearing rail segments (82) and (42) respectively to bear the rotatable load during relative rotation of the first and second frame assemblies (10) and (12), respectively. Bearing assembly (36) is formed of a plurality of bearing segments (70) each of which is larger than the corresponding one of the upper or lower rail segments (82) and (42), respectively. It will also be noted that the lower bearing segment (70) and lower bearing rail segment (42) protrude beyond and are exposed by frame (12) in an area (34) on each side of the upper frame assembly (12) and the separation of the upper bearing rails (116) and (118) occurring at that point creates an exposed area or "window" (34) where inspection of the gear (38), lower bearing rails (42), and bearing segments (70) occur. Each of the roller bearing segments (70) is smaller than the exposed area (34) and, since each of the lower bearing rail segments (42) occupies the space shown by arc (112) and since each of the roller bearing segments (70) occupy the space indicated by arc (114), it will be seen that each roller bearing segment (70) is longer than each of the upper and lower rail segments (82) and (42) and all of which are smaller than the exposed area (34). Thus, each of the upper and lower rail segments (82) and (42), and each of the bearing segments (70) may be removed and replaced in the exposed area (34) without any separation of the upper and lower frame assemblies (10) and (12) from their normal positions. It will be noted that when the upper frame assembly (12) is positioned as shown in FIG. 6 to cause the upper arcuate but separated sections of bearing rail (116) and (118) to be positioned so as to cause the upper rail bearing section separation (120) to be located in exposed area (34), roller bearing segment (70) is visible and can be removed. At the same time, the corresponding lower rail segment (42), which is under roller bearing segment (70) can be removed and both of the assemblies replaced with new components. The upper frame assembly (12) can then be rotated clockwise or counterclockwise thus moving exposed area (34) to the next roller segment (70) and corresponding lower bearing segment (42) where they can be removed and replaced. In like manner each of the roller bearing segments (70) and corresponding lower bearing rail segment (42) can be removed and replaced.

It is obvious from FIG. 5 and FIG. 6 that once the roller bearing segment (70) of roller bearing ring (36) and corresponding lower rail segment (42) have been removed in exposed area (34) in the position located as shown in FIG. 6, the upper frame assembly (12) could then be rotated sufficiently to cause an individual upper rail segment (126) to be positioned over that space where the lower rail segment (42) and roller bearing segment (70) have been removed. This will allow the operator to unbolt upper rail segment (126) and replace it. In like manner, each of the other upper rail segments (82) can be removed and replaced simply by rotating the upper frame assembly (12) until the desired upper rail segment (82) is located over that position where the bearing roller segment (70) and corresponding lower bearing rail segment (42) have been removed. Once each of the upper rail segments have been replaced, then the last lower bearing rail segment (42) and last roller bearing segment (70) can be replaced and all of this can take place without any separation between the upper and lower frame sections (10) and (12) of the power shovel as has been required in the prior art.

Of course, to modify an existing swing gear assembly for a power mining shovel to incorporate the present invention, the existing unitary swing gear assembly (38) has to be removed, the locating member (84) has to be rigidly and accurately attached to the lower frame assembly (10) as by welding, the second locating member (108) has to be rigidly and accurately attached to upper frame (12) as by welding, a replacement swing gear (38) has to be formed of at least two matching segments but preferably four segments (44), (46), (48) and (50), and these segments have to be positioned with respect to locating member (84) having vertical projection (104) thereon to form a unitary swing gear assembly accurately positioned on the lower frame assembly to prevent linear sliding movement of the gear assembly. The attached gear segments (44), (46), (48) and (50) have to be removably attached to the lower frame assembly (10) to prevent rotation thereof. Thus, the swing gear (38) may be removed and replaced upon moving the upper frame assembly in spaced relationship to the lower frame assembly (10) without total separation of the two assemblies as has been required in the prior art.

Thus, there has been disclosed an improved swing gear and bearing assembly for a power mining shovel wherein the swing gear itself is formed of a plurality of segments which can be removed and replaced without total separation of the upper and lower frame assemblies of the power shovel and which can be easily replaced by utilizing a positioning member rigidly attached to the lower frame so that upon locating the gear segments on the positioning or locating member, and joining the gear segments together, a unitary gear is formed which is accurately positioned with respect to the central journal about which the upper portion of the machine rotates.

In addition, the roller bearings themselves are formed in segments which can be removed in an exposed area and the upper and lower bearing rail segments are also formed in segments smaller than the roller bearing segments and which can also be removed and replaced in the exposed area. The upper rail segments are formed in two arcuate portions having a separation which is fixed in the location of the exposed area formed by the sides of upper frame 12. This allows the maintenance personnel to remove the roller bearing segment visible in the exposed area where the upper rail separation occurs, as well as the lower bearing rail segment which is under it. Simply by rotating the upper frame assembly allows a new roller bearing segment and lower rail segment to appear in the exposed area where each of them can be removed and replaced. In like manner, by removing a roller bearing assembly and lower bearing rail assembly, and then positioning an upper bearing rail segment over the location where the bearing segment and lower bearing rail segment has been removed, each of the upper bearing rail segments can be sequentially removed and replaced.

Figure 7:
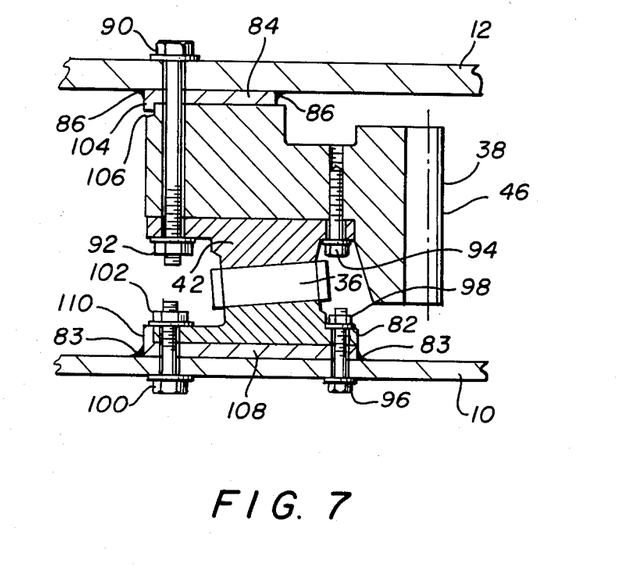
FIG. 7 shows parts reversed from that shown in FIG. 5 such that the swing gear is mounted on the upper rotatable portion of the power shovel.

While the invention has been described with the improved swing gear attached to the lower stationary frame assembly, it is possible, as shown in FIG. 7, to mount the swing gear on the upper rotatable portion of the power shovel and such mounting is contemplated by the present invention.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

I claim:

1. An improved swing gear and swing gear bearing assembly for a power mining shovel having an upper frame assembly coupled to a lower frame assembly for relative rotation by said swing gear assembly comprising:

a. a swing gear locating member rigidly attached to a first one of said frame assemblies for accurately positioning said swing gear and preventing linear sliding movement of said gear with respect to said first one of said frame assemblies,
b. said gear locating member comprising a plate having a vertical annular projection thereon, said annular projection having a diameter such that said projection abuts the inner periphery of said annular swing gear whereby said gear is prevented from sliding linearly with respect to said first one of said frame assemblies,
c. at least first and second matching annular gear segments forming a unitary swing gear when joined, and
d. means for removably attaching said gear segments to said locating member to form a unitary swing gear assembly accurately positioned on said first one of said frame assemblies whereby the swing gear may be removed and replaced without total separation of the upper and lower frame assemblies.

2. An improved swing gear assembly as in claim 1 wherein said first one of said frame assemblies is the upper rotatable portion of said power mining machine and the other one of said frame assemblies is the lower stationary portion of said mining machine.

3. An improved swing gear assembly as in claim 1 wherein said first one of said frame assemblies is the lower stationary portion of said mining machine and the other one of said frame assemblies is the upper rotatable portion of said mining machine.

4. An improved swing gear assembly as in claim 1 wherein said plate for said vertical annular projection comprises:
a. an annular plate, and
b. a lip forming said vertical projection on the inner periphery of said annular plate.

5. An improved swing gear and swing gear bearing assembly for coupling an upper frame assembly of a power mining shovel to a lower frame assembly for relative rotation of said assemblies, said upper frame assembly exposing an area in which a portion of said swing gear and bearing assembly is visible and may be inspected, said improved assembly comprising:
a. a plurality of first arcuate bearing rail segments removably attached to said swing gear on a first one of said frame assemblies to form a 360 degree bearing rail,
b. a plurality of second arcuate bearing rail segments removably attached to the other one of said frame assemblies to form first and second arcuate but separated sections of bearing rail in juxtaposed relationship to said first bearing rail segments, said separation of said arcuate sections occurring in said exposed area formed by said upper frame assembly, and
c. a bearing assembly positioned between said first and second bearing rails to bear the rotatable load during relative rotation of said upper and lower frame assemblies, said bearing assembly being formed of a plurality of arcuate bearing segments, each of which is larger than one of said first or second rail segment and each of which is smaller than said area of separation of said first and second bearing rail sections occurring in said other frame assembly whereby each of said first and second rail segments and each of said bearing segments may be removed and replaced in said exposed area without separation of said upper and lower frame assemblies.

6. An improved swing gear bearing assembly as in claim 5 wherein first one of said frame assemblies is the upper rotatable portion of said mining machine and said other one of said frame assemblies is the lower stationary portion of said mining machine.

7. Apparatus as in claim 5 wherein said first one of said frame assemblies is the lower stationary portion of said mining machine and said other one of said frame assemblies is the upper rotatable portion of said mining machine.

8. Apparatus as in claim 5 further comprising means for coupling said arcuate bearing segments together to form a continuous annular bearing assembly.

9. Apparatus for improving the swing gear and the swing gear bearing assembly for coupling an upper frame assembly of a mining machine to a lower frame assembly for relative rotation, said upper frame forming an exposed area in which a portion of said swing gear and bearing is visible and may be inspected, said apparatus comprising:
a. a swing gear locating member rigidity attached to a first one of said frame assemblies for accurately positioning said swing gear and preventing linear sliding movement of said gear with respect to said first one of said frame assemblies,
b. at least first and second matching annular gear segments forming a unitary swing when joined,
c. means for removably attaching said gear segments to said locating member to form a unitary swing gear assembly accurately positioned on said first one of said frame assemblies whereby the swing gear may be removed and replaced without total separation of the upper and lower frame assemblies,
d. a plurality of first acruate bearing rail segments removably attached to said swing gear to form a 360 degree bearing rail,
e. a plurality of second arcuate bearing rail segments removably attached to the other one of said frame assemblies to form first and second arcuate but separated sections of bearing rail in juxtaposed relationship to said first bearing rail segments, said separation of said arcuate sections occurring in the exposed area formed by said upper frame assembly, and
f. a bearing assembly positioned between said first and second bearing rails to bear the rotatable load during relative rotation of said upper and lower frame assemblies, said bearing assembly being formed of a plurality of arcuate bearing segments each of which is larger than one of said first or second rail segments and each of which is smaller than said area of separation of said first and second bearing rail sections occurring in said exposed area formed by said upper frame assembly whereby each said first and second rail segments and each of said bearing segments may be removed and replaced in said exposed area without separation of said upper and lower frame assemblies.

10. Apparatus as in claim 9 wherein said first one of said frame assemblies is the upper rotatable portion of said mining machine and the other one of said frame assemblies is the lower stationary portion of said mining machine.

11. Apparatus as in claim 9 wherein said one of said frame assemblies is the lower stationary portion of said mining machine and the other one of said frame assemblies is the upper rotatable portion of said mining machine.

12. Apparatus as in claim 9 further comprising means for coupling each of said bearing segments to another to form a continuous annular bearing assembly.

13. A method of improving the swing gear and swing gear assembly for a power mining shovel having an upper frame assembly coupled to a lower frame assembly for relative rotation by said swing gear assembly, said method comprising the steps of:
   a. rigidly attaching a swing gear locating member on a first one of said frame assemblies for accurately positioning said swing gear and preventing linear sliding movement of said gear with respect to said first one of first frame assemblies,
   b. forming said swing gear of at least two matching annular segments with the gear teeth on the outer periphery thereof,
   c. forming said locating member of a plate having a vertical annular projection thereon, said locating member annular projection having a diameter such that said projection abuts the inner periphery of said annular swing gear whereby said swing gear is prevented from sliding linearly with respect to said first one of said frame assemblies,
   d. joining said gear segments together with respect to said locating member to form a continuous unitary swing gear assembly accurately positioned on said first one of said frame assemblies, and
   e. removably attaching said gear segments to said locating member in fixed orientation whereby said swing gear may be removed and replaced upon moving said first one of said frame assemblies in spaced relationship to the other one of said frame assemblies without total separation of the two assemblies.

14. A method as in claim 13 wherein said first one of said frame assemblies is the upper rotatable portion of said power mining machine and the other one of said frame assemblies is the lower stationary portion of said mining machine.

15. A method as in claim 13 wherein said first one of said frame assemblies is the lower stationary portion of said mining machine and the other one of said frame assemblies is the upper rotatable portion of said mining machine.

16. A method as in claim 13, further including the steps of:
   a. forming said plate having said vertical projection thereon in the shape of an annular plate, and
   b. forming said vertical projection as a lip on the inner periphery of said annular plate.

17. A method of modifying the swing gear and swing gear assembly for a power mining shovel having an upper frame assembly rotatably coupled to a lower frame assembly by said swing gear assembly comprising the steps of:
   a. removing the existing unitary swing gear assembly,
   b. rigidly attaching a swing gear locating member on a first one of said frame assemblies for accurately positioning said swing gear and preventing linear sliding movement of said gear with respect to said first one of said frame assemblies,
   c. forming a replacement swing gear of at least two annular segments with the gear teeth on the outer periphery thereof,
   d. forming said locating member of a plate having a vertical annular projection thereon, said locating member annular projection having a diameter such that said projection abuts the inner periphery of said annular swing gear whereby said swing gear is prevented from sliding linearly with respect to said first one of said frame assemblies,
   e. joining said annular gear segments together with respect to said locating member to form a unitary swing gear assembly accurately positioned on said first one of said frame assemblies and
   f. removably attaching said gear segments to said locating member in fixed orientation whereby said swing gear may be removed and replaced upon moving said first one of said frame assemblies in spaced relationship to the other one of said frame assemblies without total separation of the two assemblies.

18. A method as in claim 17 wherein said first one of said frame assemblies is the upper rotatable portion of said power mining machine and the other one of said second frame assemblies is the lower stationary portion of said mining machine.

19. A method as in claim 17 wherein said first one of said frame assemblies is the lower stationary portion of said mining machine and the other one of said frame assemblies is the upper rotatable portion of said mining machine.

20. A method as in claim 17 further including the steps of:
   a. forming said plate having said vertical projection thereon in the shape of an annular plate, and
   b. forming said vertical projection as a lip on the inner periphery of said annular plate.

21. A method of improving the swing gear and the swing gear bearing assembly for coupling an upper frame assembly of a mining machine to a lower frame assembly for relative rotation, said upper frame assembly exposing an area in which said swing gear and bearing assembly is visible and may be inspected, an improved method comprising the steps of:
   a. rigidly attaching a swing gear locating member on a first one of said frame assemblies for accurately positioning said swing gear and preventing linear sliding movement of said gear with respect to said first one of said frame assemblies,
   b. forming said swing gear of at least two matching annular segments,
   c. joining said segments together with respect said locating member to form a swing gear assembly accurately positioned on said first one of said frame assemblies,
   d. removably attaching said gear segments to said locating member in fixed orientation whereby said swing gear may be removed and replaced upon moving said first one of said frame assemblies in spaced relationship to the other one of said frame assemblies without total separation of the two assemblies,
   e. removably attaching a first plurality of arcuate bearing rail segments to said swing gear to form a 360 degree bearing rail,
   f. removably attaching a second plurality of arcuate bearing rail segments to said other one of said frame assemblies to form first and second arcuate but separated sections of bearing rail in juxtaposed relationship to said first bearing rail segments, said separation of said arcuate sections occurring in said exposed area created by said upper frame assembly, and g. positioning a bearing assembly between said first and second bearing rails to bear the rotatable load during relative rotation of said upper and lower frame assemblies, said bearing assembly being formed of a plurality of arcuate bearing segments each of which is larger than one of said first or second rail segments and each of which is smaller than said area of separation of said first and second bearing rail sections occurring in said exposed area created by said upper frame assembly whereby each of said first and second rail segments and each of said bearing segments may be removed and replaced in said exposed area without any separation of said upper and lower frame assemblies.

22. A method as in claim 21 further comprising the steps of:

a. forming said swing gear segments in an annular shape with the gear teeth on the outer periphery thereof, b. forming said locating member of a plate having a vertical annular projection thereon, said locating member annular projection having a diameter such that the projection abuts the inner periphery of said annular swing gear whereby said gear is prevented from sliding linearly with respect to said first frame assembly, and c. removably attaching said annular gear segments to said locating member.

23. A method as in claim 22 wherein first one of said frame assemblies is the upper rotatable portion of said power mining machine and the other one of said frame assemblies is the lower stationary portion of said mining machine.

24. A method as in claim 22 wherein said first one of said frame assemblies is the lower stationary portion of said mining machine and the other one of said frame assemblies is the upper portion of said mining machine.

25. A method as in claim 22 further including the steps of:

a. forming said plate having said vertical projection thereon in the shape of an annular plate, and b. forming said vertical projection as a lip on the inner periphery of said annular plate.

26. A method as in claim 21 further comprising the step of coupling said plurality of bearing segments together to form a continuous annular bearing assembly.

27. A method of improving the swing gear and the swing gear bearing assembly coupling an upper frame assembly of a power mining shovel to a lower frame assembly for relative rotation of said frame assemblies, said upper frame assembly exposing an area in which a portion of said swing gear and bearing assembly is visible and may be inspected, the method comprised in the steps of;

a. removably attaching a first plurality of arcuate bearing rail segments to said swing gear on a first one of said frame assemblies to form a 360 degree bearing rail, b. removably attaching a second plurality of arcuate bearing rail segments to the other one of said frame assemblies to form first and second arcuate but separated sections of bearing rail in juxtaposed relationship to said first bearing rail segments, said separation of said arcuate sections occurring in said exposed area formed by said upper frame assembly, and c. positioning a bearing assembly between said first and second bearing rails to bear the rotatable load during relative rotation of said upper and lower frame assemblies, said bearing assembly being formed of a plurality of arcuate bearing segments, each of which is larger than one of said first or second rail segments and each of which is smaller than said area of separation of said first and second bearing rail sections occurring in said other frame assembly whereby each of said first and second rail segments and each of said bearing segments may be removed and replaced in said exposed area without any separation of said upper and lower frame assemblies.

28. A method as in claim 27 wherein said first one of said frame assemblies is the upper rotatable portion of said mining machine and said other frame assembly is the lower stationary portion of said mining machine.

29. A method as in claim 27 wherein said first one of said frame assemblies is the lower stationary portion of said mining machine and said other frame assembly is the upper rotatable portion of said mining machine.

30. A method as in claim 27 further comprising the step of coupling said plurality of bearing segments together to form a continuous annular bearing assembly.

* * * * *